United States Patent
Khan et al.

(10) Patent No.: US 9,410,062 B1
(45) Date of Patent: Aug. 9, 2016

(54) MOISTURE CURE ASPHALTIC MATERIAL AND METHODS OF USE

(71) Applicant: Gardner-Gibson, Inc., Tampa, FL (US)

(72) Inventors: Amir G. Khan, Valrico, FL (US); Andrew L. Troxell, Tampa, FL (US); Sean Hyer, Tampa, FL (US)

(73) Assignee: Gardner-Gibson, Inc., Tampa, FL (US)

( * ) Notice: Subject to any disclaimer, the term of this patent is extended or adjusted under 35 U.S.C. 154(b) by 0 days.

(21) Appl. No.: 14/742,236

(22) Filed: Jun. 17, 2015

(51) Int. Cl.
| | |
|---|---|
| *C09J 195/00* | (2006.01) |
| *C09J 175/04* | (2006.01) |
| *C09J 163/00* | (2006.01) |
| *C08K 3/36* | (2006.01) |
| *C08K 3/26* | (2006.01) |
| *C08K 5/5419* | (2006.01) |
| *C08K 3/34* | (2006.01) |
| *C08K 5/12* | (2006.01) |

(52) U.S. Cl.
CPC ............. *C09J 195/00* (2013.01); *C09J 163/00* (2013.01); *C09J 175/04* (2013.01); *C08K 3/26* (2013.01); *C08K 3/34* (2013.01); *C08K 3/36* (2013.01); *C08K 5/12* (2013.01); *C08K 5/5419* (2013.01); *C08K 2003/265* (2013.01)

(58) Field of Classification Search
CPC ....................................................... C09J 195/00
See application file for complete search history.

(56) References Cited

U.S. PATENT DOCUMENTS

| | | | | |
|---|---|---|---|---|
| 5,253,461 | A | * 10/1993 | Janoski | ................... E04D 11/02 156/71 |
| 7,317,051 | B2 | 1/2008 | Georgeau et al. | |
| 7,772,301 | B2 | 8/2010 | Fensel et al. | |
| 2006/0089432 | A1 | * 4/2006 | Kawakami | .............. C08L 95/00 524/59 |
| 2006/0276559 | A1 | * 12/2006 | Hernandez | ............. C08G 18/10 521/151 |

* cited by examiner

*Primary Examiner* — Marc Zimmer
(74) *Attorney, Agent, or Firm* — Greenberg Traurig, LLP

(57) ABSTRACT

An adhesive composition has an asphaltic base. A plasticizer, solvent, resin, calcium carbonate, fumed silica, talc an adhesion promoter, a moisture scavenger and a catalyst are included in the adhesive. The resin may be a silylated prepolymer, two part urethane, one part urethane prepolymer, or two part epoxy. Optionally a micronized polyamide wax is added to the composition. Further optionally, an asphalt hardener and/or a silica flour may be included in the mix.

19 Claims, 1 Drawing Sheet

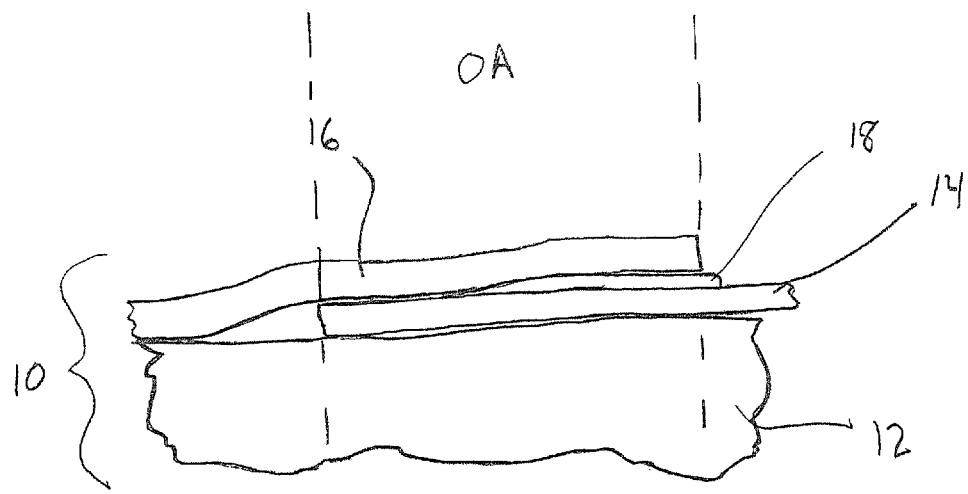

MOISTURE CURE ASPHALTIC MATERIAL AND METHODS OF USE

FIELD

The present invention relates to asphalt materials, and more particularly, to a material that may be used to adhere layers of building materials, such as roofing and/or provide a water resistant sealer and filler for gaps, joints or other infiltration points in structures and coverings.

BACKGROUND

Roofing and other applications, such as, basement sealing and waterproofing frequently use water-resistant coatings and sealers to fill cracks, gaps or seams between sheets of water resistant membranes, such as roll roofing or shingles and to adhere one sheet or portion of the membrane or roofing material to another portion. Typically, roofing and weatherproofing materials are applied in multiple sheets or pieces, in that buildings are of a large scale, such that it is sometimes not practical to try to cover a surface, such as a roof or basement wall with a single, uninterrupted sheet of building material. As a result, it is desirable to have a filler/sealer/adhesive (hereinafter referred to as "adhesive") that can be used to join one piece of material to another to assemble a water-proof assembly of pieces and to seal gaps and joints. Preferably, the adhesive material glues the pieces together with sufficient strength to maintain integrity under the stresses of the given application and is sufficiently flexible to allow the pieces of weatherproofing material to expand and contract in response to changes in temperature without breaking the bonds established by the adhesive. For reasons of economy, it is desirable for the adhesive to be made from materials that are reasonable in cost, given the large amount of adhesive that may be required for large expanses of roofing or other sealing applications. It is also desirable to avoid compounds in the adhesive that are a risk to health or to the environment, e.g., volatile organic compounds (VOCS). Due to water resistance, accessibility, safety and other attributes, asphaltic materials have traditionally found extensive use in waterproofing, e.g., for use in roofing systems. There is continuing interest, therefore, in new asphaltic products, such as adhesives, that have desirable properties with respect to their ease of application, compatibility with existing roofing products, low VOC content and water-resistance.

SUMMARY

The disclosed subject matter relates to a composition having in the following weight percentages: asphalt 20.0 to 28.0, plasticizer 7.0 to 18.0, solvent 1.0 to 5.0, resin 22.0 to 28.0, calcium carbonate 10.0 to 34.0, fumed silica 1.0 to 3.0, talc 1.0 to 3.0, adhesion promoter 1.0 to 3.0, moisture scavenger 1.0 to 3.0 and catalyst 0.02 to 0.8.

In another embodiment, the resin is at least one of silylated prepolymer, two part urethane or two part epoxy, the plasticizer is a phthalate, the solvent is a hydrocarbon and the adhesion promoter is a diamino functional silane.

In another embodiment, the weight ranges are asphalt 22.0 to 25.0, plasticizer 7.0 to 9.0, solvent 1.0 to 2.0, resin 22.0 to 25.0, calcium carbonate 30.0 to 34.0, fumed silica 1.0 to 3.0, talc 1.0 to 3.0, diamino functional silane 1.0 to 3.0, the moisture scavenger is a vinylmethoxysilane and the catalyst is dibutyltin dilaurate and further comprising a micronized polyamide wax rheology modifier in the weight range of 1 to 3.

In another embodiment, the approximate weight of each component is asphalt 24.2, plasticizer 8.1, solvent 1.53, resin 24.4, calcium carbonate 31.5, fumed silica 2.54, talc 2.54, diamino functional silane 1.0, vinylmethoxysilane 1.5, dibutyltin dilaurate 0.05 and micronized polyamide wax 2.54.

In another embodiment, the composition exhibits a density of about 9.3 lbs/gal., a tack-free time of 240 minutes, a passing low Temperature flex at −20 degree ° C., an elongation % of 350, a tensile strength of 390 PSI, a Shore hardness A of 65, a solids % of 98.5 and a VOC content of about 16.7 g/L.

In another embodiment, a method for making a composition involves mixing in the following weight percentages: asphalt 20.0 to 28.0, plasticizer 7.0 to 18.0, solvent 1.0 to 5.0, resin 22.0 to 28.0, calcium carbonate 10.0 to 34.0, fumed silica 1.0 to 3.0, Talc 1.0 to 3.0, adhesion promoter 1.0 to 3.0, moisture scavenger 1.0 to 3.0 and catalyst 0.02 to 0.1 in the following order and under the following parameters: warming the asphalt to an initial temperature of 145° C. to 160° C.; mixing the plasticizer, solvent, resin, calcium carbonate, fumed silica and talc with the asphalt; allowing the temperature of the mixture to decline below 35 C; adding the adhesion promoter, moisture scavenger and catalyst to the reduced temperature mixture and further mixing.

In another embodiment, the calcium carbonate, fumed silica and talc are premixed and heat treated before adding and mixing with the asphalt.

In another embodiment, mixing micronized polyamide wax with the asphalt while the asphalt is at a temperature of 145° C. to 165° C.

In another embodiment, further including asphalt hardener in a range of 0.25 to 0.8 wt % and silica flour in a range of 12-16 wt %.

In another embodiment, the weight % ranges are asphalt 22.0 to 28.0, plasticizer 7.0 to 9.0, solvent 1.0 to 3.0, resin 22.0 to 28.0, calcium carbonate 10.0 to 15.0, fumed silica 1.0 to 2.0, talc 1.0 to 3.0, adhesion promoter 1.0 to 3.0, the moisture scavenger is a vinylmethoxysilane present in a wt % of 1 to 3 and the catalyst is dibutylin dilaurate present in a wt % of 0.02 to 0.1.

In another embodiment, the approximate weight of each component is asphalt 25.5, asphalt hardener 0.5, plasticizer 8.0, solvent 2.5, resin 27, calcium carbonate 12.5, fumed silica 1.0, talc 2.5, adhesion promoter 1.5, moisture scavenger 2, and catalyst 0.05.

In another embodiment, the composition exhibits a density of about 10.7 lbs/gal., a viscosity of 150,000 cps, a tack-free time of 150 minutes, a passing low Temperature flex at −20° C., an elongation % of 201, a tensile strength of 42 PSI, a solids % of 97.5 and a VOC content of about 46.8 g/L.

In another embodiment, a method for making a composition includes the steps of: mixing in the following weight percentages, asphalt 22.0 to 28.0, asphalt hardener 0.25 to 0.8, plasticizer 7.0 to 9.0, solvent 1.0 to 3.0, resin 22.0 to 28.0, calcium carbonate 10.0 to 15.0, fumed silica 1.0 to 2.0, talc 1.0 to 3.0, silica flour 12.0-16.0, in the following order and under the following parameters: warming the asphalt to an initial temperature of 145° C. to 160° C.; mixing the asphalt hardener, plasticizer, solvent, resin, calcium carbonate, fumed silica, talc and silica flour with the asphalt; allowing the temperature of the mixture to decline below 35 C; adding the adhesion promoter, moisture scavenger and catalyst to the reduced temperature mixture and further mixing.

In another embodiment, the calcium carbonate, fumed silica and talc are premixed and heat treated before adding and mixing with the asphalt.

In another embodiment, the weight % ranges are asphalt 20.0 to 24.0, plasticizer 14.0 to 18.0, solvent 2.0 to 5.0, resin 22.0 to 25.0, calcium carbonate 26.0 to 30.0, fumed silica 1.0 to 3.0, talc 1.0 to 3.0, adhesion promoter 1.0 to 3.0, the moisture scavenger is a vinylmethoxysilane present in a wt % of 1 to 3 and the catalyst is dibutyltin dilaurate present in a wt % of 0.02 to 0.1.

In another embodiment, the approximate weight of each component is asphalt 21.5, plasticizer 16.0, solvent 4.25, resin 23.9, calcium carbonate 27.55, fumed silica 1.5, talc 2.5, adhesion promoter 1.5, moisture scavenger 1.25, and catalyst 0.05.

In another embodiment, the composition exhibits a density of about 9.09 lbs/gal., a viscosity of 50,000 cps, a tack-free time of 120 minutes, a passing low Temperature flex at −20 degree C., a solids % of 97.5, a VOC content of about 49.02 g/L and an adhesion of 53.14 lbs.

In another embodiment, a method for making a composition, includes the steps of: mixing in the following weight percentages: asphalt 20.0 to 24.0, plasticizer 14.0 to 18.0, solvent 2.0 to 5.0, resin 22.0 to 25.0, calcium carbonate 26.0 to 30.0, fumed silica 1.0 to 3.0, talc 1.0 to 3.0, diamino functional silane 1.0 to 3.0, vinylmethoxysilane 1 to 3 and dibutyltin dilaurate 0.02 to 0.1 in the following order and under the following parameters: warming the asphalt to an initial temperature of 145° C. to 160° C.; mixing the asphalt hardener, plasticizer, solvent, resin, calcium carbonate, fumed silica and talc with the asphalt; allowing the temperature of the mixture to decline below 35 C; adding the diamino functional silane, vinylmethoxysilane and dibutyltin dilaurate to the reduced temperature mixture and mixing all ingredients.

In another embodiment, the calcium carbonate, fumed silica and talc are premixed and heat treated before adding and mixing with the asphalt.

BRIEF DESCRIPTION OF THE DRAWINGS

For a more complete understanding of the present disclosure, reference is made to the following detailed description of exemplary embodiments considered in conjunction with the accompanying drawings.

FIG. 1 is diagrammatic, cross-sectional view of a section of a plurality of layers of roofing material with an adhesive in accordance with an embodiment of the present disclosure interposed there between.

DETAILED DESCRIPTION OF EXEMPLARY EMBODIMENTS

FIG. 1 shows a laminar structure 10 having a base or foundation layer(s) 12, which may be a made from wood, roofing underlayment, layers of old roofing, metal, waterproof membranes, etc. A first layer of roofing material 14, e.g., asphaltic roll roofing is applied over the base layer 12. A second layer of roofing material 16, e.g., made from the same or a different material as first layer 14, is applied to the base layer 12 to cover another part of the base layer 12, defining an overlap area OA relative to the first layer 14. An adhesive 18 may be applied to the first layer 14 and/or the second area 16 in the overlap area OA to mechanically bond the first layer 14 and the second layer 16 in the overlap area OA and to form a seal to exclude the infiltration of water and weather from the overlap area OA. In this manner, the laminar structure 10 may be made water-tight using a plurality of separate pieces of roofing material, i.e., layers 14, 16. Of course, this approach may be replicated a selected number of times to yield a laminar structure 10 having a desired number of layers, 14, 16. This layering approach may be applied to other sealing tasks, such as waterproofing a foundation wall with water-resistant membranes.

In a first embodiment, the adhesive 18 may be composed of a material in accordance with the following formula:
Designation: S100-1

| Component | Description | % Wt |
| --- | --- | --- |
| 1. Asphalt | McKee AC-5 | 24.2 |
| 2. Miconized Polyamide Wax | Crayvallac SLX | 2.54 |
| 3. Plasticizer | DINP | 8.1 |
| 4. Hisol | Aromatic-10 | 1.53 |
| 5. SPUR 1050MM | Resin | 24.4 |
| 6. Calcium Carbonate | Drikalite | 31.5 |
| 7. Fumed Silica | Aerosil | 2.54 |
| 8. Talc | Mineral Filler | 2.54 |
| 9. Adhesion Promoter | A-1120 | 1.1 |
| 10. Moisture Scavenger | A-171 | 1.5 |
| 11. Catalyst | DABCO T-12 | 0.05 |

The asphalt component AC5 is a typical asphalt. Grades of asphalt ranging from an asphalt flux to resid(hard) can be utilized; PG52-28 to PG 82-22) is a cement grade asphalt available from many different sources, such as U.S. Oil and Refining of Tacoma, Wash., and may be present in the above formulation in a range of 22 to 25 wt. %. DINP is a phthalate used as a plasticizer, typically a mixture of various isononyl esters of phthalic acid that is available from Exxon Mobile (exxonmobile.com) and may be present in the above formulation in a range of 7 to 9 wt %. Hisol is an aromatic hydrocarbon solvent and may be present in the above formulation in a range of 1 to 2 wt %. SPUR 1050MM polymer is a low viscosity, silylated prepolymer, available from Momentive (Momentive.com) and may be present in the above formulation in a range of 22 to 25 wt %. Calcium Carbonate (Drikalite) may be obtained from Imerys (imerys-perfmins.com) and may be present in the above formulation in a range of 30 to 34 wt %.

Fumed silica is amorphous silica fused into branched, chainlike, three-dimensional secondary particles which then agglomerate into tertiary particles. It has low bulk density and high surface area and may be used to increase viscosity when used as a thickener or reinforcing filler or for thixoptropic properties and may be present in the above formulation in a range of 1 to 3 wt %. Talc may be obtained from Imerys (imerystalc.com) and may be present in the above formulation in a range of 1 to 3 wt %.

Adhesion promoter A-1120, available from Momentive (momentive.com) is a diamino functional silane that may be used to promote the adhesion of amino-reactive resins such as silicone, silylated polyurethane, two-part urethanes and two-part epoxies to inorganic surfaces, plastic surfaces, and inorganic fillers or reinforcements and may be present in the above formulation in a range of 1 to 3 wt %. Moisture scavenger A-171, available from Momentive (momentive.com) is a vinylmethoxysilane that may be used to scavenge moisture, cross-link and bond to inorganic substrates and may be present in the above formulation in a range of 1 to 3 wt %.

Dabco T-12 catalyst (dibutyltin dilaurate, DBTDL) is available from Air Products (airproducts.com) and promotes the urethane (polyol-isocyanate) or gelling reaction for the production of polyurethane foams, coatings, adhesives, sealants and elastomers. Dabco T-12 catalyst may be present in the above formulation in a range of 0.02 to 0.5 wt %.

Optional Ingredients for S100-1:

An amide similar to Crayvallac SLX, which is a micronized amide wax rheology modifier available from Arkema Coating Resins may be present in a range of 1-3 wt %. Optionally, adhesion promoters such as A-187 can be used as a replacement for A-1120. A-187 is an epoxy silane that promotes adhesion to inorganic and plastic surfaces.

Preparation of Adhesive S100-1

An adhesive made in accordance with the foregoing formula may be made by the following method:

In a suitable mixing device, asphalt (ingredient 1 in the above list of ingredients) at an initial temperature of 145° C.-160° C. may be mixed with the ingredients listed as 2-8. Preferably, filler ingredients 6, 7 and 8 are premixed and heat-treated to remove moisture before adding to the asphaltic mixture. After mixing the first eight ingredients, the temperature is allowed to fall to <35° C., after which ingredients 9-11 are added to the mixture.

The resultant mixture may be stored in suitable containers/packaging, e.g., injected into caulk tubes or poured into sealable metal or plastic cans. To avoid/remove moisture, the mixture may be mixed and stored under vacuum conditions. The packaged mixture may be used immediately or stored. If stored, it is preferred to avoid exposure of the mixture to heat and moisture. Under suitable conditions, the stored mixture has a shelf life of 6 months to 1 year.

Use/Application of the Adhesive S100

The bonding material may be used for forming a bonding layer, such a layer 18 by direct application to a surface, e.g., by discharging the bonding material from a caulk tube onto the surface. Alternatively, a spreading tool, such as a brush, roller or trowel may be used to remove the bonding material from a storage receptacle, e.g., a can, and apply it to a surface.

Properties of the Adhesive with Designation S100

When prepared and applied as described above, the bonding material has the following properties. For comparison, the properties of another type of sealant/adhesive (M-1 Sealant from ChemLink (chemlink.com) were measured by the same methods.

| Property | S100 | Control (M-1 Sealant) |
| --- | --- | --- |
| Density (lbs/gal) | 9.335 | 11.8 |
| Viscosity (cps) | 900,000 | 1,200,000 |
| Tack Free Time (min) | 240 | 20 +/− 10 |
| Low Temp Flex (−20° C.) | Pass | Pass |
| Elongation (%) | 350 | 290 |
| Tensile Strength (PSI) | 390 | 330 |
| Shore Hardness A | 65 | 45 |
| Solids (%) | 98.5 | 100 |
| VOC (g/L) | 16.77 | 0 |

In a second embodiment, the adhesive 18 may be composed of a material in accordance with the following formula:

Designation: C100-7

| Component | Description | % Wt |
| --- | --- | --- |
| 1. Asphalt | McKee AC-5 | 25.50 |
| 2. Asphalt Hardener | PGXpand 502 | 0.5 |
| 3. Plasticizer | DINP | 8 |
| 4. Hisol | Aromatic 10 | 2.5 |
| 5. SPUR 1050MM | Resin | 27 |
| 6. Calcium Carbonate | Drikalite | 12.5 |
| 7. Silica Flour | Imsil | 15.95 |
| 8. Fumed Silica | Aerosil | 1.00 |
| 9. Talc | Mineral Filler | 2.5 |
| 10. Adhesion Promoter | A-1120 | 1.5 |
| 11. Moisture Scavenger | A-171 | 2 |
| 12. Catalyst | DABCO T-12 | 0.05 |

In the C100-7 embodiment, Asphalt may be present in a range of 22 to 28 wt %. DINP may be present in a range of 7 to 9 wt %. Hisol may be present in a range of 1 to 3 wt %. SPUR 1050MM polymer may be present in a range of 22 to 28 wt %. Additional polymers and pre-polymer grades can also be utilized solely or in conjunction with 1050MM. Silanol functional fluids with varying viscosities may also be present in a range of 20 to 28 wt %. Calcium Carbonate may be present in a range of 10 to 15 wt %. Fumed silica may be present in a range of 1 to 2 wt %. Talc may be present in a range of 1 to 3 wt %. Adhesion promoter A-1120, may be present in a range of 1 to 3 wt %. Moisture scavenger A-171 may be present in a range of 1 to 3 wt %. Dabco T-12 catalyst may be present in a range of 0.02 to 0.5 wt %. PGXpand 502 is an asphalt additive available from Sripath Technologies. It is used to increase the softening point and may be present in a range of 0.25-0.8 wt %. Imsil Silica Flour is available from Imerys and may be present in a range of 12-16 wt %.

Preparation of Adhesive C100-7

An adhesive made in accordance with the foregoing formula may be made by the following method: In a suitable mixing device, asphalt (ingredient 1 in the above list of ingredients) at an initial temperature of 145° C.-160° C. may be mixed with the ingredients listed as 2-9. Preferably, filler ingredients 6, 7, 8 and 9 are premixed and heat-treated to remove moisture before adding to the asphaltic mixture. After mixing the first nine ingredients, the temperature is allowed to fall to <35° C., after which ingredients 10-12 are added to the mixture. The resultant mixture may be stored in suitable containers/packaging, e.g., injected into caulk tubes or poured into sealable metal or plastic cans. To avoid/remove moisture, the mixture may be mixed and stored under vacuum conditions. The packaged mixture may be used immediately or stored. If stored, it is preferred to avoid exposure of the mixture to heat and moisture. Under suitable conditions, the stored mixture has a shelf life of 6 months to 1 year.

Use/Application of the C100-7 Adhesive

The adhesive material may be used for forming an adhesive layer, such a layer 18 by direct application to a surface, e.g., by discharging the adhesive material from a caulk tube onto the surface. Alternatively, a spreading tool, such as a brush, roller, squeegee or trowel may be used to remove the bonding material from a storage receptacle, e.g., a can, and apply it to a surface.

Properties of the Adhesive with Designation C100-7

When prepared and applied as described above, the adhesive material has the following properties. For comparison, the properties of a liquid waterproofing membrane from ChemLink (chemlink.com) were measured by the same methods.

| Property | C100-7 | Control (Barr Waterproofing membrane) |
| --- | --- | --- |
| Density (lbs/gal) | 10.7 | 10.7 |
| Viscosity (cps) | 150,000 | 275,000 |
| Tack Free Time (min) | 150 | 45 |
| Low Temp Flex (−20° C.) | Pass | Pass |
| Elongation (%) | 201 | 290 |
| Tensile Strength (PSI) | 42 | 58 |
| Solids (%) | 97.5 | 100 |
| VOC (g/L) | 46.78 | 0 |

In a third embodiment, the adhesive 18 may be composed of a material in accordance with the following formula:

Designation: A100-7

| Component | Description | % Wt |
|---|---|---|
| 1. Asphalt | McKee AC-5 | 21.5 |
| 2. Plasticizer | DINP | 16 |
| 3. Hisol | Aromatic 10 | 4.25 |
| 4. SPUR 1050MM | Resin | 23.9 |
| 5. Calcium Carbonate | Drikalite | 27.55 |
| 6. Fumed Silica | Aerosil | 1.5 |
| 7. Talc | Mineral Filler | 2.5 |
| 8. Adhesion Promoter | A-1120 | 1.5 |
| 9. Moisture Scavenger | A-171 | 1.25 |
| 10. Catalyst | DABCO T-12 | 0.05 |

In the A-100-7 embodiment, Asphalt may be present in a range of 20 to 24 wt. %. DINP may be present in a range of 14 to 18 wt %. Hisol may be present in a range of 2 to 5 wt %. SPUR 1050MM polymer may be present in a range of 22 to 25 wt %. Calcium Carbonate may be present in a range of 26 to 30 wt %. Fumed silica may be present in a range of 1 to 3 wt %. Talc may be present in a range of 1 to 3 wt %. Adhesion promoter A-1120, may be present in a range of 1 to 3 wt %. Moisture scavenger A-171 may be present in a range of 1 to 3 wt %. Dabco T-12 catalyst may be present in a range of 0.02 to 0.1 wt %.

Preparation of Adhesive A100-7

An adhesive made in accordance with the foregoing formula may be made by the following method: In a suitable mixing device, asphalt (ingredient 1 in the above list of ingredients) at an initial temperature of 145° C.-160° C. may be mixed with the ingredients listed as 2-7. Preferably, filler ingredients 5, 6 and 7 are premixed and heat-treated to remove moisture before adding to the asphaltic mixture. After mixing the first seven ingredients, the temperature is allowed to fall to <35° C., after which ingredients 8, 9 and 10 are added to the mixture. The resultant mixture may be stored in suitable containers/packaging, e.g., injected into caulk tubes or poured into sealable metal or plastic cans. To avoid/remove moisture, the mixture may be mixed and stored under vacuum conditions. The packaged mixture may be used immediately or stored. If stored, it is preferred to avoid exposure of the mixture to heat and moisture. Under suitable conditions, the stored mixture has a shelf life of 6 months to 1 year.

Use/Application of the Adhesive A100-7

The adhesive material may be used for forming an adhesive layer, such a layer 18 by direct application to a surface, e.g., by discharging the adhesive material from a caulk tube onto the surface. Alternatively, a spreading tool, such as a brush, roller, squeegee or trowel may be used to remove the bonding material from a storage receptacle, e.g., a can, and apply it to a surface.

Properties of the Adhesive with Designation A100-7

When prepared and applied as described above, the bonding material has the following properties. For comparison, the properties of another type of sealant/adhesive (SBS Mod-Bit Adhesive from ChemLink (chemlink.com) were measured by the same methods.

| Property | A100-7 | Control (Chem Link) |
|---|---|---|
| Density (lbs/gal) | 9.09 | 11.2 |
| Viscosity (cps) | 50,000 | 35,000 |
| Tack Free Time (min) | 120 | 60 +/− 40 |
| Low Temp Flex (−20° C.) | Pass | Pass |

-continued

| Property | A100-7 | Control (Chem Link) |
|---|---|---|
| Solids (%) | 97.5 | 99.5 |
| VOC (g/L) | 49.02 | 32 |
| Adhesion | 53.14 lbs | 25 lbs |

It will be understood that the embodiments described herein are merely exemplary and that a person skilled in the art may make many variations and modifications without departing from the spirit and scope of the disclosed subject matter. All such variations and modifications are intended to be included within the scope of the present disclosure and claims.

The invention claimed is:

1. A composition, comprising:
in the following weight percentages, asphalt 20.0 to 28.0, plasticizer 7.0 to 18.0, solvent 1.0 to 5.0, resin 22.0 to 28.0, calcium carbonate 10.0 to 34.0, fumed silica 1.0 to 3.0, talc 1.0 to 3.0, adhesion promoter 1.0 to 3.0, moisture scavenger 1.0 to 3.0 and catalyst 0.02 to 0.8.

2. The composition of claim 1, wherein the resin is at least one of silylated prepolymer, two part urethane or two part epoxy, the plasticizer is a phthalate, the solvent is a hydrocarbon and the adhesion promoter is a diamino functional silane.

3. The composition of claim 2, wherein the weight ranges are asphalt 22.0 to 25.0, plasticizer 7.0 to 9.0, solvent 1.0 to 2.0, resin 22.0 to 25.0, calcium carbonate 30.0 to 34.0, fumed silica 1.0 to 3.0, talc 1.0 to 3.0, diamino functional silane 1.0 to 3.0, the moisture scavenger is a vinylmethoxysilane and the catalyst is dibutyltin dilaurate and further comprising a micronized polyamide wax rheology modifier in the weight range of 1 to 3.

4. The composition of claim 3, wherein the approximate weight of each component is asphalt 24.2, plasticizer 8.1, solvent 1.53, resin 24.4, calcium carbonate 31.5, fumed silica 2.54, talc 2.54, diamino functional silane 1.0, vinylmethoxysilane 1.5, dibutyltin dilaurate 0.05 and micronized polyamide wax 2.54.

5. The composition of claim 4, wherein the composition exhibits a density of about 9.3 lbs/gal., a tack-free time of 240 minutes, a passing low Temperature flex at −20 degree ° C., an elongation % of 350, a tensile strength of 390 PSI, a Shore hardness A of 65, a solids % of 98.5 and a VOC content of about 16.7 g/L.

6. A method for making a composition, comprises the steps of: mixing in the following weight percentages, asphalt 20.0 to 28.0, plasticizer 7.0 to 18.0, solvent 1.0 to 5.0, resin 22.0 to 28.0, calcium carbonate 10.0 to 34.0, fumed silica 1.0 to 3.0, Talc 1.0 to 3.0, adhesion promoter 1.0 to 3.0, moisture scavenger 1.0 to 3.0 and catalyst 0.02 to 0.1 in the following order and under the following parameters,
warming the asphalt to an initial temperature of 145° C. to 160° C.;
mixing the plasticizer, solvent, resin, calcium carbonate, fumed silica and talc with the asphalt;
allowing the temperature of the mixture to decline below 35 C;
adding the adhesion promoter, moisture scavenger and catalyst to the reduced temperature mixture and further mixing.

7. The method of claim 6, wherein the calcium carbonate, fumed silica and talc are premixed and heat treated before adding and mixing with the asphalt.

8. The method of claim 7, further comprising mixing micronized polyamide wax with the asphalt while the asphalt is at a temperature of 145° C. to 165° C.

9. The composition of claim 1, further including asphalt hardener in a range of 0.25 to 0.8 wt % and silica flour in a range of 12-16 wt %.

10. The composition of claim 9, wherein the weight % ranges are asphalt 22.0 to 28.0, plasticizer 7.0 to 9.0, solvent 1.0 to 3.0, resin 22.0 to 28.0, calcium carbonate 10.0 to 15.0, fumed silica 1.0 to 2.0, talc 1.0 to 3.0, adhesion promoter 1.0 to 3.0, the moisture scavenger is a vinylmethoxysilane present in a wt % of 1 to 3 and the catalyst is dibutyltin dilaurate present in a wt % of 0.02 to 0.1.

11. The composition of claim 10, wherein the approximate weight of each component is asphalt 25.5, asphalt hardener 0.5, plasticizer 8.0, solvent 2.5, resin 27, calcium carbonate 12.5, fumed silica 1.0, talc 2.5, adhesion promoter 1.5, moisture scavenger 2, and catalyst 0.05.

12. The composition of claim 11, wherein the composition exhibits a density of about 10.7 lbs/gal., a viscosity of 150,000 cps, a tack-free time of 150 minutes, a passing low Temperature flex at −20° C., an elongation % of 201, a tensile strength of 42 PSI, a solids % of 97.5 and a VOC content of about 46.8 g/L.

13. A method for making a composition, comprises the steps of: mixing in the following weight percentages, asphalt 22.0 to 28.0, asphalt hardener 0.25 to 0.8, plasticizer 7.0 to 9.0, solvent 1.0 to 3.0, resin 22.0 to 28.0, calcium carbonate 10.0 to 15.0, fumed silica 1.0 to 2.0, talc 1.0 to 3.0, silica flour 12.0-16.0, in the following order and under the following parameters, warming the asphalt to an initial temperature of 145° C. to 160° C.;

mixing the asphalt hardener, plasticizer, solvent, resin, calcium carbonate, fumed silica, talc and silica flour with the asphalt;

allowing the temperature of the mixture to decline below 35 C;

adding the adhesion promoter, moisture scavenger and catalyst to the reduced temperature mixture and further mixing.

14. The method of claim 13, wherein the calcium carbonate, fumed silica and talc are premixed and heat treated before adding and mixing with the asphalt.

15. The composition of claim 1, wherein the weight % ranges are asphalt 20.0 to 24.0, plasticizer 14.0 to 18.0, solvent 2.0 to 5.0, resin 22.0 to 25.0, calcium carbonate 26.0 to 30.0, fumed silica 1.0 to 3.0, talc 1.0 to 3.0, adhesion promoter 1.0 to 3.0, the moisture scavenger is a vinylmethoxysilane present in a wt % of 1 to 3 and the catalyst is dibutyltin dilaurate present in a wt % of 0.02 to 0.1.

16. The composition of claim 15, wherein the approximate weight of each component is asphalt 21.5, plasticizer 16.0, solvent 4.25, resin 23.9, calcium carbonate 27.55, fumed silica 1.5, talc 2.5, adhesion promoter 1.5, moisture scavenger 1.25, and catalyst 0.05.

17. The composition of claim 16, wherein the composition exhibits a density of about 9.09 lbs/gal., a viscosity of 50,000 cps, a tack-free time of 120 minutes, a passing low Temperature flex at −20 degree C., a solids % of 97.5, a VOC content of about 49.02 g/L and an adhesion of 53.14 lbs.

18. A method for making a composition, comprises the steps of: mixing in the following weight percentages, asphalt 20.0 to 24.0, plasticizer 14.0 to 18.0, solvent 2.0 to 5.0, resin 22.0 to 25.0, calcium carbonate 26.0 to 30.0, fumed silica 1.0 to 3.0, talc 1.0 to 3.0, diamino functional silane 1.0 to 3.0, vinylmethoxysilane 1 to 3 and dibutyltin dilaurate 0.02 to 0.1 in the following order and under the following parameters, warming the asphalt to an initial temperature of 145° C. to 160° C.;

mixing the asphalt hardener, plasticizer, solvent, resin, calcium carbonate, fumed silica and talc with the asphalt;

allowing the temperature of the mixture to decline below 35 C;

adding the diamino functional silane, vinylmethoxysilane and dibutyltin dilaurate to the reduced temperature mixture and mixing all ingredients.

19. The method of claim 13, wherein the calcium carbonate, fumed silica and talc are premixed and heat treated before adding and mixing with the asphalt.

\* \* \* \* \*